(No Model.)  
2 Sheets—Sheet 1.
J. CORNELIUS.
TRUCK.
No. 492,273. Patented Feb. 21, 1893.
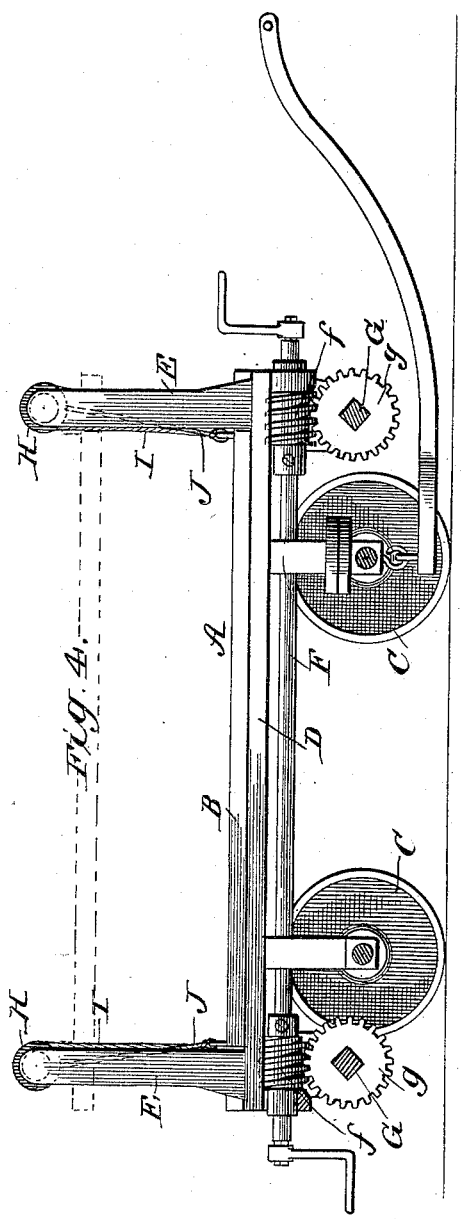
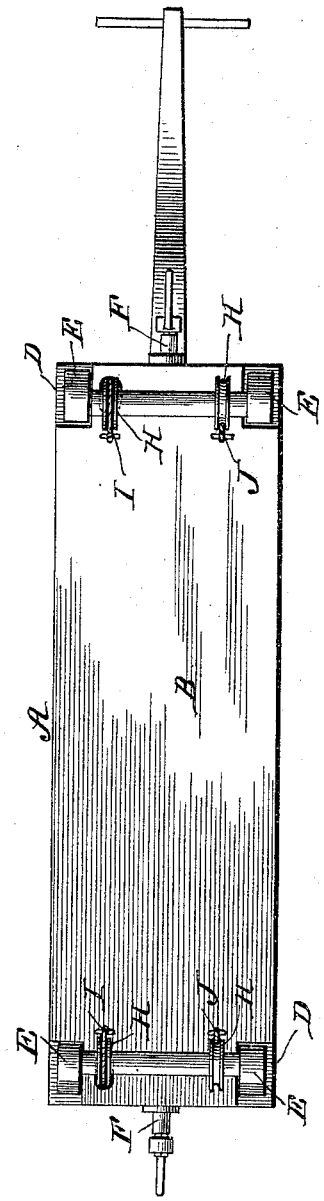
WITNESSES:
Fred G. Dieterich
P. B. Turpin
INVENTOR:
John Cornelius.
BY Munn & Co
ATTORNEYS (No Model.) 2 Sheets—Sheet 2.

J. CORNELIUS.
TRUCK.

No. 492,273. Patented Feb. 21, 1893.

WITNESSES:
Fred G. Dieterich
P. B. Turpin.

INVENTOR:
John Cornelius
BY
ATTORNEYS

THE NORRIS PETERS CO., PHOTO-LITHO., WASHINGTON, D. C.

United States Patent Office.

JOHN CORNELIUS, OF OAKLAND, MARYLAND, ASSIGNOR OF ONE-HALF TO RAYMOND S. KAYLER, OF ALLIANCE, OHIO.

TRUCK.

SPECIFICATION forming part of Letters Patent No. 492,273, dated February 21, 1893.

Application filed May 11, 1892. Serial No. 432,698. (No model.)

*To all whom it may concern:*

Be it known that I, JOHN CORNELIUS, of Oakland, in the county of Garrett and State of Maryland, have invented a new and useful Improvement in Trucks, of which the following is a specification.

My invention is an improved truck intended especially for use at railway and other freight depots, warehouses &c. where it may be desired to load heavy freight from one level onto a higher one, as for instance from the level of a platform to that of a baggage or other car door, and the invention has for objects certain improvements and consists in the novel constructions and combinations of parts hereinafter more fully described and pointed out in the claims.

Figure 2:
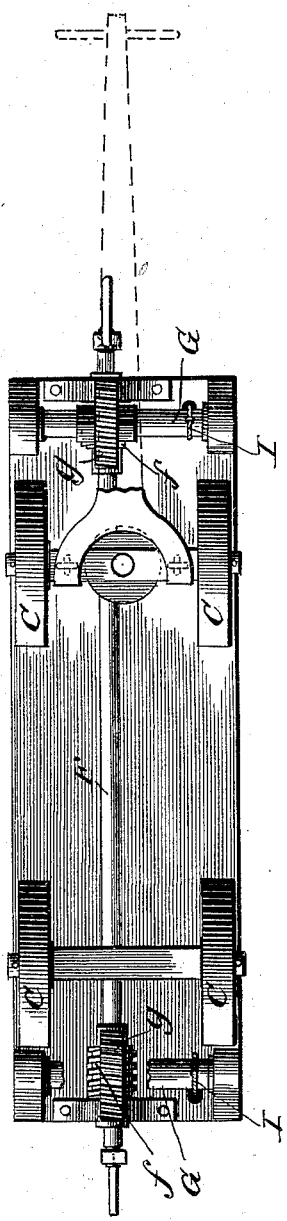
Figure 3:
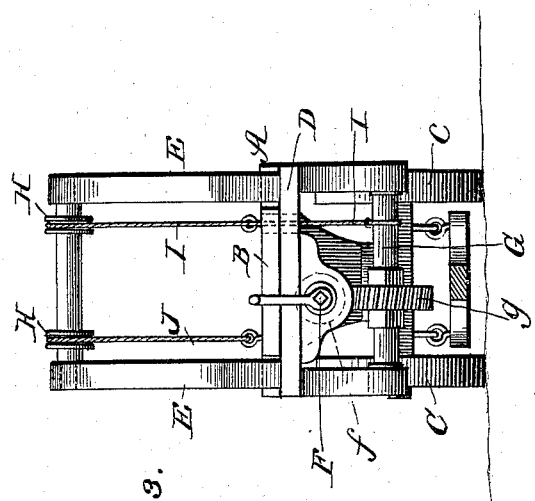

In the drawings—Figure 1 is a top plan view and Fig. 2 a bottom plan view of the truck. Fig. 3 is a front end view thereof and Fig. 4 is a side view partly broken away, the platform being shown down in full lines and elevated in dotted lines.

In loading heavy trunks and other freight into cars and the like it is often necessary to lift the same bodily by main force from a low truck to the level of a car bed, while if a high truck be used, the lift has to be made onto such truck or the lift has to be divided, a part of the lift from the platform to the car bed being made onto the truck and then the rest from the truck to the car. Now this lifting in addition to being laborious and wearing on the men requires time, the length of stops at stations being dependent in most instances upon the amount of baggage to be taken on; and where rapid transit is desirable the importance of means for facilitating the loading and unloading of baggage, &c. will be readily appreciated.

By my improvement I provide a truck in the use of which the trunks &c. may be placed on a low down platform and such platform be conveniently moved to the car and raised with its contents to the desired level, and it will be manifest such raising or elevating of the platform may be effected before or at the time the truck is brought to the side of the car as may be desired.

In carrying out my invention I provide a carriage A, a vertically movable platform B and mechanism for moving said platform vertically. In constructing the carriage it is preferred to provide it with wheels C a frame or bed D and corner uprights E and while such parts C, D and E may preferably be as shown it is to be understood that I do not desire in the broad features of my invention to be limited to the special construction thereof as shown.

The platform B is movable vertically above the bed D and may be raised and lowered by the power mechanism, such mechanism sufficing to enable the depot hands to readily raise and lower the platform and its contents without any great labor or effort and in a moment of time. The arrangement of the power mechanism below the bed is much preferred because by arranging it near the ground or platform surface, the force or effort exerted to operate such mechanism is not so likely to disturb the position of the truck as if the power mechanism were arranged higher. In carrying out this feature of my invention I provide a drive shaft F which extends from end to end of the carriage and is preferably provided at its opposite ends with crank handles or with portions to receive the same. As this shaft is turned, it through connecting mechanism with the platform B, operates to raise or lower such platform as may be desired. I also prefer to provide a drum or drums G preferably two one at each end of the carriage and geared with the drive shaft. This gearing is effected in the construction shown by providing the drums G with worm wheels $g$ and the shaft F with worms $f$ meshing with the wheels $g$ and enabling the exercise of great power in a smooth easy manner. The drums are connected with the platform B by the cables I and J. The cables I are secured at one end to the drums and pass up over the rollers H and then down and connect at their other ends to the platform; while the cables J are secured at one end to the rollers H and at their opposite ends to the platform. These cables I and J are preferably wire ropes as shown, but manifestly they may be sprocket or other chains or other forms of connections if desired.

In operation the platform may be elevated to lift trunks to the level of a car bed or to receive them from such car, the truck not only facilitating the loading of baggage into a car but also the unloading of such trunks as described.

While the special construction of parts as shown is preferred, it is manifest that I do not desire in the broad features of my invention to be restricted thereto.

Having thus described my invention, what I claim as new is—

1. The improved truck substantially as described comprising the carriage, the corner uprights thereon, the end rollers journaled in and extended between the end uprights, the platform, the drums, the cables extending thence over the end rollers and connected with the platform and operating mechanism for turning the drums substantially as set forth.

2. In a truck substantially as described the combination of the carriage, the vertically movable platform, the separate drums journaled to the carriage near its opposite ends, connections between said drums and the platform and a drive shaft geared with both said drums and arranged and adapted to simultaneously and similarly turn said drums in the operation of the device substantially as set forth.

3. The improved truck herein described consisting of the carriage, the vertically movable platform, the separate drums arranged near the opposite ends of the carriage connections between said drums and the platform, worm wheels upon said drums, and the drive shaft arranged at right angles to the drums and provided with worms meshing with the wheels of the drums whereby to operate the same substantially as set forth.

4. In a baggage truck substantially as described the combination with the carriage, the movable platform the drums arranged transversely of and at the end of the carriage, and connections between said drums and the platform, of the drive shaft, arranged longitudinally of the carriage, journaled thereto and extended beyond the ends thereof, and gearing between said drive shaft and both end drums whereby the shaft may operate the drum substantially as described.

JOHN CORNELIUS.

Witnesses:
 KATIE CORNELIUS,
 MARY WHITE.